US012213222B2

(12) United States Patent
Chen et al.

(10) Patent No.: US 12,213,222 B2
(45) Date of Patent: Jan. 28, 2025

(54) LIGHTING APPARATUS

(71) Applicant: LEEDARSON LIGHTING CO.,LTD., Fujian (CN)

(72) Inventors: Xiaowei Chen, Fujian (CN); Bin Zhang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 48 days.

(21) Appl. No.: 18/210,044

(22) Filed: Jun. 14, 2023

(65) Prior Publication Data

US 2024/0422878 A1 Dec. 19, 2024

(51) Int. Cl.
*H05B 45/37* (2020.01)
*H05B 47/16* (2020.01)

(52) U.S. Cl.
CPC ............ *H05B 45/37* (2020.01); *H05B 47/16* (2020.01)

(58) Field of Classification Search
None
See application file for complete search history.

(56) References Cited

U.S. PATENT DOCUMENTS

| | | | | |
|---|---|---|---|---|
| 11,013,081 B1 * | 5/2021 | Yang | .................... | H05B 45/325 |
| 2017/0215244 A1 * | 7/2017 | Yeh | ........................ | H05B 45/20 |
| 2022/0272810 A1 * | 8/2022 | Su | ........................ | H05B 45/345 |

* cited by examiner

*Primary Examiner* — Anh Q Tran
(74) *Attorney, Agent, or Firm* — Chun-Ming Shih; LANWAY IPR SERVICES

(57) ABSTRACT

A lighting apparatus includes a first LED module, a second LED module, a rectifier, a power circuit, a time detector, a wall switch circuit and a controller. The first LED module has a first light parameter. The second LED module has a second light parameter. The first light parameter is different from the second light parameter. The power circuit converts the DC power to a first driving current and a second driving current respectively supplied to the first LED module and the second LED module. The time detector detects a voltage time variation of the DC power. The controller is coupled to the wall switch circuit and the time detector for determining whether to adjust a current ratio between the first driving current and the second driving current according both the voltage time variation and the control signal.

20 Claims, 7 Drawing Sheets

LIGHTING APPARATUS

FIELD

The present invention is related to a lighting apparatus, and more particularly related to a lighting apparatus with flexible control.

BACKGROUND

LED light devices have become a game-changer in the lighting industry, offering several advantages over past designs such as incandescent and fluorescent lights. One of the primary advantages of LED light devices is their energy efficiency. LEDs are incredibly efficient in converting electricity into light, resulting in significant energy savings compared to traditional lighting technologies. They consume much less power while providing the same or even better illumination, making them a cost-effective choice for both residential and commercial lighting applications.

Another advantage of LED light devices is their long lifespan. LEDs have an impressive operational life that can range from 25,000 to 50,000 hours or even more, depending on the quality of the LEDs and their usage. This longevity far exceeds that of traditional incandescent or fluorescent lights, which need frequent replacements. LED light devices not only reduce maintenance costs but also contribute to reducing waste and the environmental impact associated with frequent bulb replacements.

LED light devices also offer enhanced durability and robustness. Unlike incandescent bulbs, LEDs are solid-state devices that do not contain fragile filaments or glass components. This makes them highly resistant to shocks, vibrations, and other physical impacts, making them ideal for applications in rugged environments or areas prone to frequent movement or vibration.

Additionally, LED light devices provide instant illumination without the need for warm-up time. Unlike fluorescent lights that can take a few seconds to reach full brightness, LEDs light up immediately, allowing for instant illumination when you flip the switch. This feature is particularly beneficial in areas where immediate lighting is required, such as hallways, bathrooms, or outdoor spaces.

LED light devices are also highly customizable in terms of color options and dimming capabilities. With the ability to emit light in various colors and shades, LED lights offer versatility in creating different lighting effects and moods. Additionally, LEDs can be easily dimmed, allowing users to adjust the brightness levels according to their preferences or specific lighting needs. This flexibility in color and dimming options makes LED light devices suitable for a wide range of applications, from ambient lighting to task lighting and even decorative purposes.

When it comes to controlling LED light devices, traditional wall switches can be used. LED lights are compatible with standard wall switches found in most homes and buildings. However, it's important to note that some LED light devices, especially those with advanced features like color-changing or dimming capabilities, may require specific dimmer switches or controllers for optimal functionality. These specialized switches or controllers are designed to work with the specific electrical requirements of LED lights, ensuring smooth and reliable operation without flickering or compatibility issues.

In recent years, there have been advancements in LED light device control systems, such as the introduction of smart lighting solutions. Smart LED light devices can be controlled wirelessly through smartphone apps, voice commands, or home automation systems. These smart features provide additional convenience, allowing users to adjust lighting settings, create schedules, and even integrate their LED lights with other smart devices for a seamless home automation experience.

In summary, LED light devices offer numerous advantages over past lighting designs. They are energy-efficient, long-lasting, durable, and provide instant illumination. LED lights are highly customizable in terms of color options and dimming capabilities, making them versatile for various applications. Despite their advanced features, LED light devices can still be controlled by traditional wall switches, ensuring compatibility with existing electrical infrastructure. Additionally, the emergence of smart lighting solutions has brought added convenience and flexibility to LED light device control. Overall, LED light devices have revolutionized the lighting industry, providing efficient, long-lasting, and customizable lighting solutions for homes, businesses, and beyond.

LED light devices have become a game-changer in the lighting industry, offering several advantages over past designs such as incandescent and fluorescent lights. One of the primary advantages of LED light devices is their energy efficiency. LEDs are incredibly efficient in converting electricity into light, resulting in significant energy savings compared to traditional lighting technologies. They consume much less power while providing the same or even better illumination, making them a cost-effective choice for both residential and commercial lighting applications.

Another advantage of LED light devices is their long lifespan. LEDs have an impressive operational life that can range from 25,000 to 50,000 hours or even more, depending on the quality of the LEDs and their usage. This longevity far exceeds that of traditional incandescent or fluorescent lights, which need frequent replacements. LED light devices not only reduce maintenance costs but also contribute to reducing waste and the environmental impact associated with frequent bulb replacements.

LED light devices also offer enhanced durability and robustness. Unlike incandescent bulbs, LEDs are solid-state devices that do not contain fragile filaments or glass components. This makes them highly resistant to shocks, vibrations, and other physical impacts, making them ideal for applications in rugged environments or areas prone to frequent movement or vibration.

Additionally, LED light devices provide instant illumination without the need for warm-up time. Unlike fluorescent lights that can take a few seconds to reach full brightness, LEDs light up immediately, allowing for instant illumination when you flip the switch. This feature is particularly beneficial in areas where immediate lighting is required, such as hallways, bathrooms, or outdoor spaces.

LED light devices are also highly customizable in terms of color options and dimming capabilities. With the ability to emit light in various colors and shades, LED lights offer versatility in creating different lighting effects and moods. Additionally, LEDs can be easily dimmed, allowing users to adjust the brightness levels according to their preferences or specific lighting needs. This flexibility in color and dimming options makes LED light devices suitable for a wide range of applications, from ambient lighting to task lighting and even decorative purposes.

When it comes to controlling LED light devices, traditional wall switches can be used. LED lights are compatible with standard wall switches found in most homes and buildings. However, it's important to note that some LED light devices, especially those with advanced features like color-changing or dimming capabilities, may require specific dimmer switches or controllers for optimal functionality. These specialized switches or controllers are designed to work with the specific electrical requirements of LED lights, ensuring smooth and reliable operation without flickering or compatibility issues.

In recent years, there have been advancements in LED light device control systems, such as the introduction of smart lighting solutions. Smart LED light devices can be controlled wirelessly through smartphone apps, voice commands, or home automation systems. These smart features provide additional convenience, allowing users to adjust lighting settings, create schedules, and even integrate their LED lights with other smart devices for a seamless home automation experience.

In summary, LED light devices offer numerous advantages over past lighting designs. They are energy-efficient, long-lasting, durable, and provide instant illumination. LED lights are highly customizable in terms of color options and dimming capabilities, making them versatile for various applications. Despite their advanced features, LED light devices can still be controlled by traditional wall switches, ensuring compatibility with existing electrical infrastructure. Additionally, the emergence of smart lighting solutions has brought added convenience and flexibility to LED light device control. Overall, LED light devices have revolutionized the lighting industry, providing efficient, long-lasting, and customizable lighting solutions for homes, businesses, and beyond.

In addition, the detection of different kinds of wall switches is also a difficult task because if it takes too long time to do that, the overall performance may be lowered down.

Therefore, it is beneficial to design a control circuit to smart and accurately detect and adapt to different wall switches.

SUMMARY

In some embodiments, a lighting apparatus includes a first LED module, a second LED module, a rectifier, a power circuit, a time detector, a wall switch circuit and a controller.

The first LED module has a first light parameter.

The second LED module has a second light parameter.

The first light parameter is different from the second light parameter.

The rectifier converts an AC power to a DC power.

The power circuit converts the DC power to a first driving current and a second driving current respectively supplied to the first LED module and the second LED module.

The time detector detects a voltage time variation of the DC power.

The wall switch circuit is coupled to a wall switch mounted on a wall for converting an wall switch operation of the wall switch to a control signal.

The controller is coupled to the wall switch circuit and the time detector for determining whether to adjust a current ratio between the first driving current and the second driving current according both the voltage time variation and the control signal.

In some embodiments, if the voltage time variation is smaller than a predetermined time period, even the wall switch operation instructs a mixing adjustment to the controller, the controller ignores the wall switch operation.

In some embodiments, the wall switch is a TRIAC switch.

In some embodiments, the wall switch operation is performed by a user for operating the wall switch with a series of operation patterns within an operation time period.

In some embodiments, the series of operation patterns are a sequence of on-off operations.

In some embodiments, the series of operation patterns are a sequence of amount variation operations.

In some embodiments, the wall switch has a visible code to be scanned by a mobile phone for connecting to a configuration guideline web page.

The guideline web page instructs a user to operate the wall switch to perform multiple input patterns to be associated with different control signals of the controller.

In some embodiments, the controller records the input patterns of the user and associates the input patterns with different control signals of the controller.

In some embodiments, the input patterns are selected by the user and memorized by the controller.

In some embodiments, the time detector has a clock shared with a wireless module coupled to the controller.

In some embodiments, the wireless module receives a setting from an external device.

The setting is transmitted to the controller to change a length of the predetermined time period.

In some embodiments, the lighting apparatus may also include a manual switch disposed on a housing containing the controller for adjusting a length of the predetermined time period.

In some embodiments, the wall switch circuit detects a type of the wall switch.

When the type of the wall switch is in a first set, the voltage time variation is adopted for determining the current ratio adjustment.

When the type of the wall switch is in a second set, the voltage time variation is ignored for determining the current ratio adjustment.

In some embodiments, the first set includes TRIAC switch.

In some embodiments, the second set includes 0-10V switch.

In some embodiments, the lighting apparatus may also include a night light source.

The first light LED module and the second LED module are activated in a first working mode, and.

The night light source is activated in a second working mode.

The night light source alternatively shares the power circuit with the first LED module and the second LED module.

In some embodiments, the voltage time variation is ignored in the second working mode.

In some embodiments, the lighting apparatus may also include an energy change circuit for lowering an overall power output of the power circuit in the second working mode.

In some embodiments, the controller switches the second working mode in an emergent case when the power circuit receives power from a battery.

In some embodiments, the wall switch is operated to activate the first LED module and the second LED module for an temporary period in the emergent case.

The time detector counts whether time has passed over the temporary period and instructs the controller to switch back to the second working mode.

DETAILED DESCRIPTION

Figure 7:
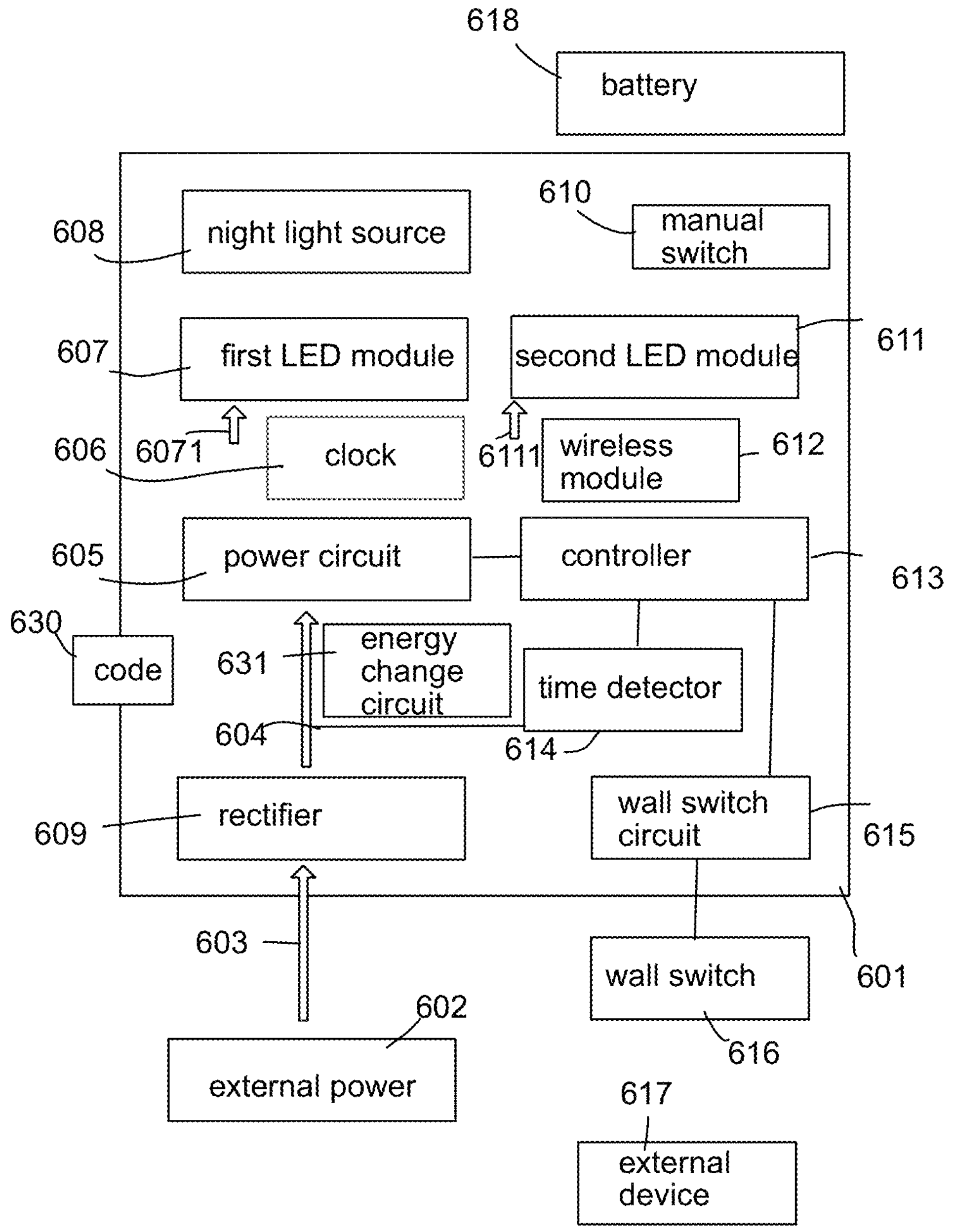
FIG. 7 illustrates another embodiment of a lighting apparatus.

In FIG. 7, a lighting apparatus includes a first LED module 607, a second LED module 611, a rectifier 609, a power circuit 605, a time detector 614, a wall switch circuit 615 and a controller 613. There is a housing 601 for holding these components.

The housing 601 is changed depending on different light device types, e.g. a downlight device, a panel light device, a spot light device and/or even a light bulb device.

The first LED module 607 has a first light parameter. The second LED module 610 has a second light parameter.

The first light parameter is different from the second light parameter, e.g. different colors, different color temperatures, different color rendering indexes.

In some other embodiments, there may be more types of LED modules. With two or more LED modules, light of required parameters may be obtained by mixing the first LED module, the second LED module and/or other additional light sources.

The rectifier 609 converts an AC power 603 to a DC power 604. The AC power 603 may be a 110V AC power. LED modules unlike traditional light sources need direct current source. Thus, the rectifier 609 may include a transformer, a filter and/or other components to generate a stable DC power.

The power circuit 605 converts the DC power 604 to a first driving current 6071 and a second driving current 6771 respectively supplied to the first LED module 607 and the second LED module 611.

The time detector 614 detects a voltage time variation of the DC power 604.

In different embodiments, the time detector 614 may be implemented with different ways. For example, the time detector 614 may be implemented as an analog circuit, which uses a capacitor with a calculated capacity to filter voltage variation within a certain time period. If the voltage variation is larger than the time period, the overflowed signal may be detected by the controller, thus making the capacitor as a time detector 614.

In some other embodiments, the time detector 614 may be made with a digital circuit. In such way, a clock with associated circuit may be used for counting time passed when detecting a voltage variation.

It is found that voltage variation may occur due to some types of wall switches but not occur in some other types of wall switches. For those wall switches that may cause voltage variation, e.g. TRIAC switch, the time detector 615 is disposed for finding such factor and provides the information to the controller 613 to prevent error judgement of color adjustment.

For example, users may just try to turn on or turn off a light, but the wall switch causes a time variation, making the controller make wrong decision to change color temperature, which may confuse the users.

The wall switch circuit 615 is selectively coupled to a wall switch 616 mounted on a wall for converting an wall switch operation of the wall switch 616 to a control signal.

The wall switch operation may vary depending on different types of wall switches. It is important and flexible if the controller may detect and adapt its operation to fit various wall switches, including traditional wall switches.

The controller 613 is coupled to the wall switch circuit 615 and the time detector 614 for determining whether to adjust a current ratio between the first driving current 6071 and the second driving current 6111 according both the voltage time variation and the control signal.

In some embodiments, if the voltage time variation is smaller than a predetermined time period, even the wall switch operation instructs a mixing adjustment to the controller, the controller ignores the wall switch operation.

In some embodiments, the wall switch is a TRIAC switch.

In some embodiments, the wall switch operation is performed by a user for operating the wall switch with a series of operation patterns within an operation time period.

In some embodiments, the series of operation patterns are a sequence of on-off operations. For example, when users press turn-on and turn-off for three times within 3 seconds may be associated to a first wall switch operation. When users press turn-on for 2 seconds and then turn-off for 1 second may be associated to a second wall switch operation. Different wall switch operations may instruct the controller 613 to do different tasks, e.g. to change color temperature, to change color and/or other things. Multiple wall switch operations may be combined as a complete operation to make the operation more flexible.

In some embodiments, the series of operation patterns are a sequence of amount variation operations. For example, to turn the light intensity rotation button to a largest level and then turn it to lowest level within 2 seconds may be associated to a first wall switch operation.

In some embodiments, the wall switch has a visible code 630 to be scanned by a mobile phone for connecting to a configuration guideline web page.

Specifically, when users want to configure the setting of the controller 613. Users may rely on the wall switch. However, the wall switch may be a simple device, e.g. an on/off switch and thus tells little information on how to operate it.

In such case, a QR code or some other codes may be provided on the surface of the wall switch so that users may scan the code 630 to access to a remote web page, which provides guidelines.

When the user operates the wall switch as indicated in the guidelines, an input pattern is recognized and recorded by the controller 613 to customize the settings as indicated by the user.

The guideline web page instructs a user to operate the wall switch to perform multiple input patterns to be associated with different control signals of the controller.

In some embodiments, the controller records the input patterns of the user and associates the input patterns with different control signals of the controller.

In some embodiments, the input patterns are selected by the user and memorized by the controller.

In some embodiments, the time detector has a clock shared with a wireless module coupled to the controller.

In some embodiments, the wireless module receives a setting from an external device 617.

The setting is transmitted to the controller to change a length of the predetermined time period.

In some embodiments, the lighting apparatus may also include a manual switch 610 disposed on a housing containing the controller for adjusting a length of the predetermined time period. For example, the predetermined time period may have an initial value but it may cause inaccurate judgement for the controller 613. In such case, the manual switch 610, e.g. a sliding switch on the housing 601 may be disposed for users to fine-tune the predetermined time period and/or other parameters.

In some embodiments, the wall switch circuit detects a type of the wall switch.

When the type of the wall switch is in a first set, the voltage time variation is adopted for determining the current ratio adjustment.

When the type of the wall switch is in a second set, the voltage time variation is ignored for determining the current ratio adjustment.

In some embodiments, the first set includes TRIAC switch.

In some embodiments, the second set includes 0-10V switch.

In some embodiments, the lighting apparatus may also include a night light source 608.

The first light LED module 607 and the second LED module 611 are activated in a first working mode, and.

The night light source 608 is activated in a second working mode.

The night light source 608 alternatively shares the power circuit with the first LED module 607 and the second LED module 611.

Specifically, the night light source 608 may be used in night bed time and in such time, the first LED module 607 and the second LED module 611 are turned off completely. In the day time, the night light source 608 is turned off completely. They share the same power circuit 605 in different time or different working modes.

In some embodiments, the voltage time variation is ignored in the second working mode.

In some embodiments, the lighting apparatus may also include an energy change circuit 631 for lowering an overall power output of the power circuit in the second working mode.

In some embodiments, the controller switches the second working mode in an emergent case when the power circuit receives power from a battery 618.

In some embodiments, the wall switch is operated to activate the first LED module and the second LED module for an temporary period in the emergent case.

The time detector 614 counts whether time has passed over the temporary period and instructs the controller to switch back to the second working mode.

Figure 1:
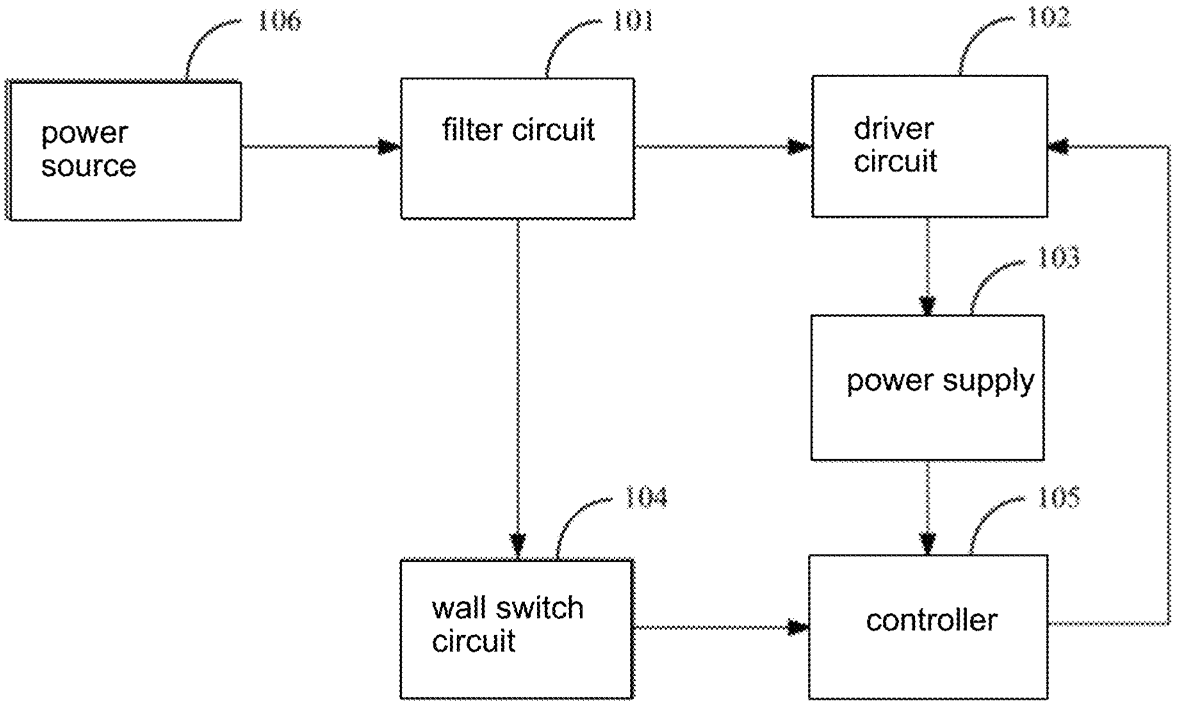
FIG. 1 illustrates a circuit diagram that illustrates a first embodiment.

Please refer to FIG. 1, which shows a circuit diagram illustrating an example to implement above invention.

In FIG. 1, there is a power source 106, a filter circuit 101, a driver circuit 102, a power supply 103, a controller 105 and a wall switch circuit 104.

The filter 101 converts an AC power to a DC power. The driver circuit 102 generates driving currents to LED modules, as mentioned above. The power supply 103 generates corresponding power for the controller 105. The controller 105 controls the driver circuit to adjust driving currents based on wall switch circuit 104 that may be integrated with a time detector mentioned above.

Figure 2:
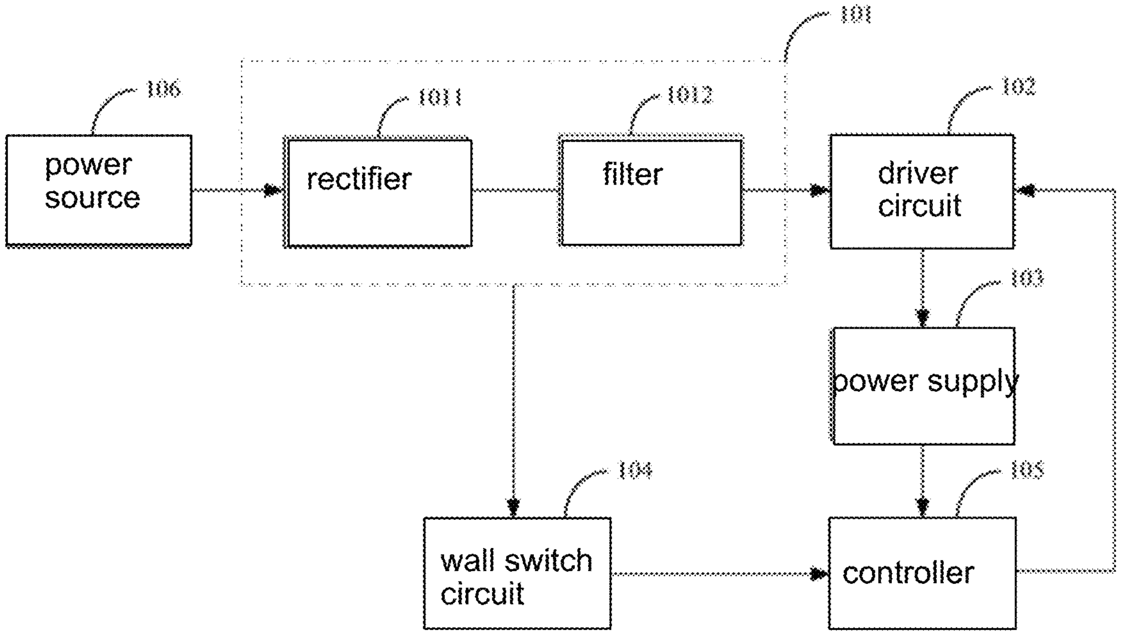
FIG. 2 illustrates a second circuit diagram to show a more detailed example of FIG. 1.

In FIG. 2, the same reference numerals refer to the same components of FIG. 1. In addition to the components mentioned above, the filter circuit 101 may include a rectifier 1011 to convert an AC power to a DC power, and a filter 1012 to make the direct current more smooth.

Figure 3:
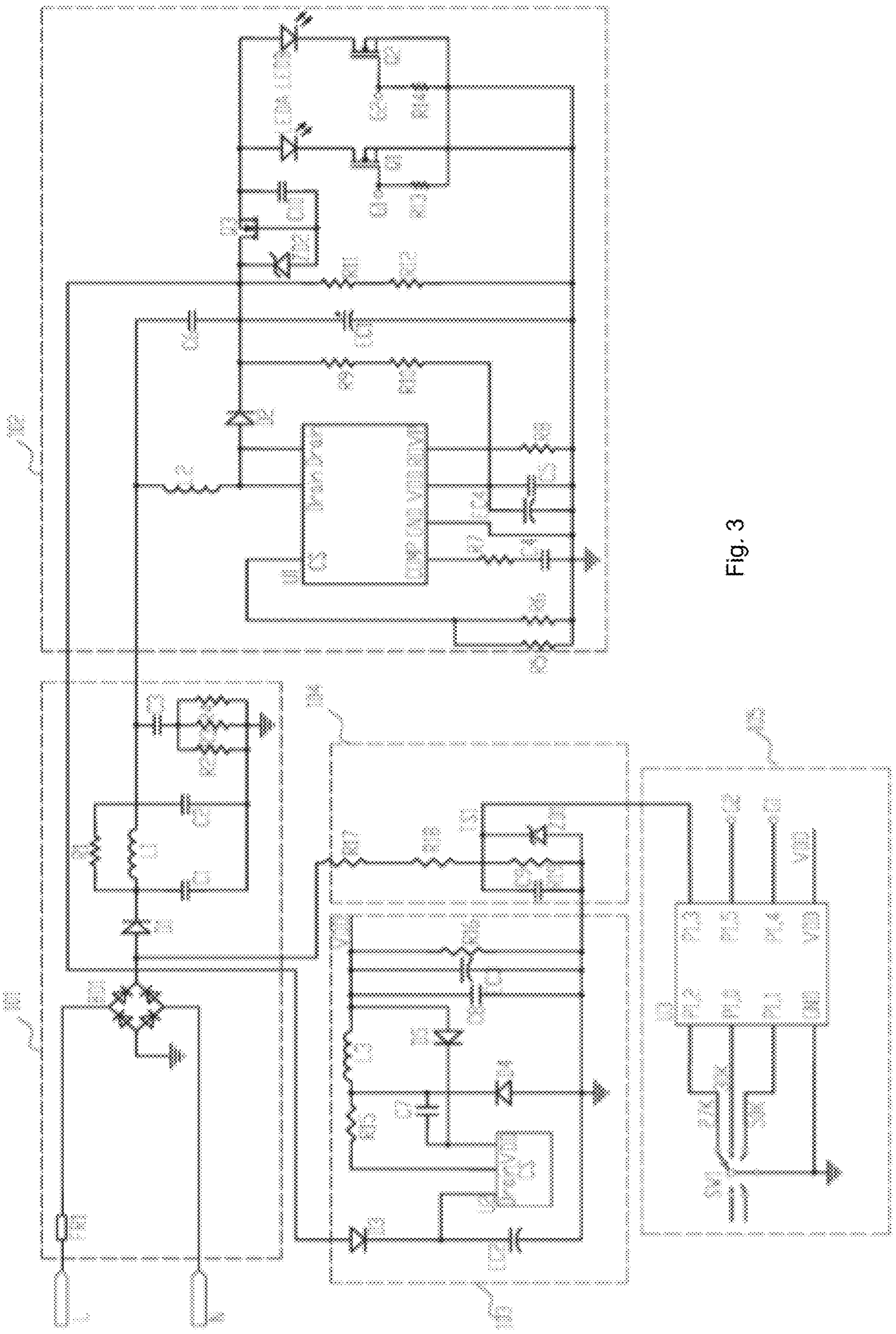
FIG. 3 illustrates a detailed circuit example to implement the control circuit in FIG. 1.

In FIG. 3, an exemplary detailed circuit diagram is provided to show a way to implement the circuit diagram in FIG. 1 and FIG. 2. The reference numerals refer to the blocks mentioned in FIG. 1 and FIG. 2.

Figure 4:
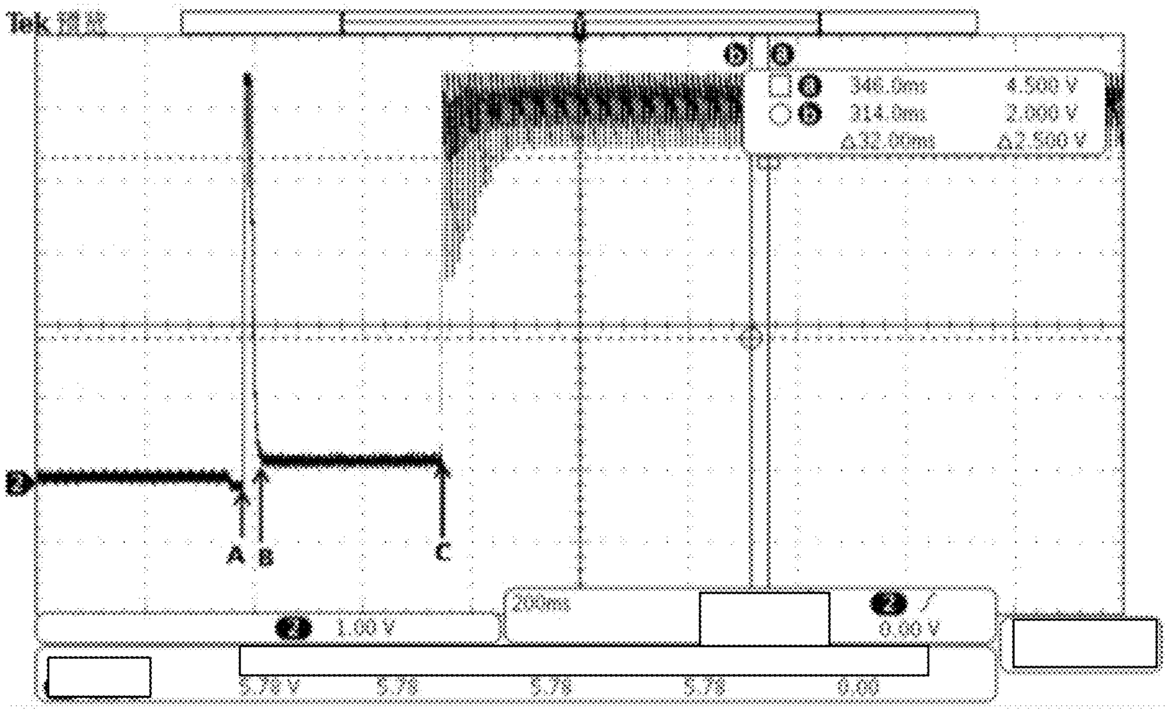
FIG. 4 illustrates a time variation diagram during control.

FIG. 4 illustrates a time variation diagram obtained during an experiment to develop this invention.

In FIG. 4, the voltage variation in point A, B, C are detected by the voltage time detector to determine whether it is an operation or just a noise caused by the wall switch.

Figure 5:
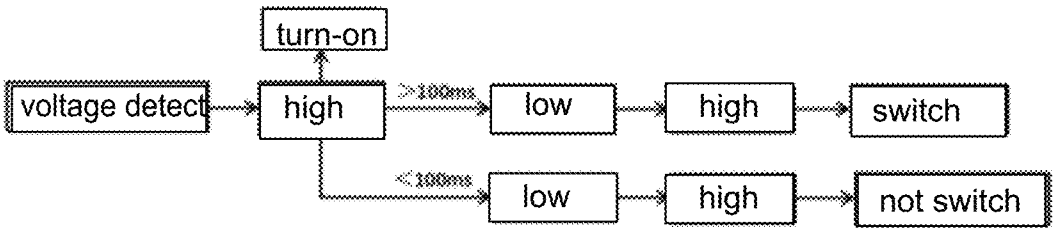
FIG. 5 illustrates a first example indicating a first scenario.

FIG. 5 shows that when the voltage changing from high to low is larger than a time period or less than a time period, different operation, like to switch color temperature adjustment or not is performed.

Figure 6:
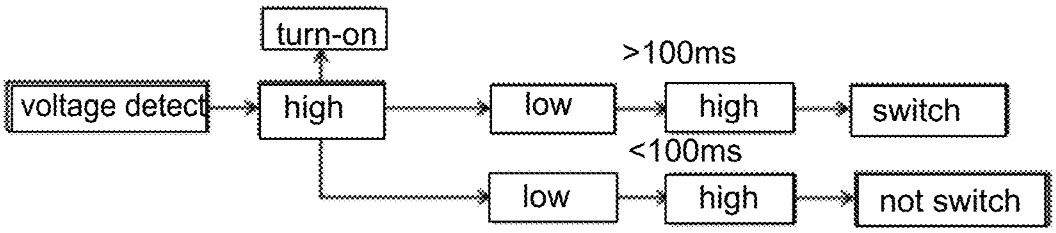
FIG. 6 illustrates a second example indicating a second scenario.

FIG. 6 shows another detection point of the voltage variation over time.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:

a first LED module with a first light parameter;

a second LED module with a second light parameter, wherein the first light parameter is different from the second light parameter;

a rectifier for converting an AC power to a DC power;

a power circuit for converting the DC power to a first driving current and a second driving current respectively supplied to the first LED module and the second LED module;

a time detector for detecting a voltage time variation of the DC power;

a wall switch circuit coupled to a wall switch mounted on a wall for converting an wall switch operation of the wall switch to a control signal;

a controller coupled to the wall switch circuit and the time detector for determining whether to adjust a current ratio between the first driving current and the second driving current according both the voltage time variation and the control signal.

2. The lighting apparatus of claim 1, wherein if the voltage time variation is smaller than a predetermined time period, even the wall switch operation instructs a mixing adjustment to the controller, the controller ignores the wall switch operation.

3. The lighting apparatus of claim 1, wherein the wall switch is a TRIAC switch.

4. The lighting apparatus of claim 1, wherein the wall switch operation is performed by a user for operating the wall switch with a series of operation patterns within an operation time period.

5. The lighting apparatus of claim 4, wherein the series of operation patterns are a sequence of on-off operations.

6. The lighting apparatus of claim 4, wherein the series of operation patterns are a sequence of amount variation operations.

7. The lighting apparatus of claim 1, wherein the wall switch has a visible code to be scanned by a mobile phone for connecting to a configuration guideline web page, wherein the the guideline web page instructs a user to operate the wall switch to perform multiple input patterns to be associated with different control signals of the controller.

8. The lighting apparatus of claim 7, wherein the controller records the input patterns of the user and associates the input patterns with different control signals of the controller.

9. The lighting apparatus of claim 8, wherein the input patterns are selected by the user and memorized by the controller.

10. The lighting apparatus of claim 1, wherein the time detector has a clock shared with a wireless module coupled to the controller.

11. The lighting apparatus of claim 10, wherein the wireless module receives a setting from an external device, wherein the setting is transmitted to the controller to change a length of the predetermined time period.

12. The lighting apparatus of claim 1, further comprising a manual switch disposed on a housing containing the controller for adjusting a length of the predetermined time period.

13. The lighting apparatus of claim 1, wherein the wall switch circuit detects a type of the wall switch, wherein when the type of the wall switch is in a first set, the voltage time variation is adopted for determining the current ratio adjustment, wherein when the type of the wall switch is in a second set, the voltage time variation is ignored for determining the current ratio adjustment.

14. The lighting apparatus of claim 13, wherein the first set comprises TRIAC switch.

15. The lighting apparatus of claim 14, wherein the second set comprises 0-10V switch.

16. The lighting apparatus of claim 1, further comprising a night light source, wherein the first light LED module and the second LED module are activated in a first working mode, and wherein the night light source is activated in a second working mode, wherein the night light source alternatively shares the power circuit with the first LED module and the second LED module.

17. The lighting apparatus of claim 16, wherein the voltage time variation is ignored in the second working mode.

18. The lighting apparatus of claim 16, further comprising an energy change circuit for lowering an overall power output of the power circuit in the second working mode.

19. The lighting apparatus of claim 16, wherein the controller switches the second working mode in an emergent case when the power circuit receives power from a battery.

20. The lighting apparatus of claim 16, wherein the wall switch is operated to activate the first LED module and the second LED module for an temporary period in the emergent case, wherein the time detector counts whether time has passed over the temporary period and instructs the controller to switch back to the second working mode.

* * * * *